United States Patent
Fujita et al.

(10) Patent No.: US 8,472,310 B2
(45) Date of Patent: Jun. 25, 2013

(54) PACKET DISTRIBUTION BAND CONTROLLING METHOD, DISTRIBUTING APPARATUS, AND VIDEO DISTRIBUTING SYSTEM

(75) Inventors: Shin Fujita, Kawasaki (JP); Yuichi Terui, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 42 days.

(21) Appl. No.: 11/902,771

(22) Filed: Sep. 25, 2007

(65) Prior Publication Data
US 2008/0062982 A1 Mar. 13, 2008

Related U.S. Application Data

(63) Continuation of application No. PCT/JP2005/005579, filed on Mar. 25, 2005.

(51) Int. Cl.
*H04L 12/26* (2006.01)
*H04L 1/18* (2006.01)

(52) U.S. Cl.
USPC .............................. 370/216; 370/244; 714/748

(58) Field of Classification Search
None
See application file for complete search history.

(56) References Cited

U.S. PATENT DOCUMENTS

| | | | | |
|---|---|---|---|---|
| 5,490,168 A * | 2/1996 | Phillips et al. | ............... | 375/224 |
| 5,526,399 A | 6/1996 | Kameda | | |
| 5,600,663 A * | 2/1997 | Ayanoglu et al. | ........... | 714/774 |
| 5,699,365 A * | 12/1997 | Klayman et al. | ............ | 714/708 |
| 5,828,677 A * | 10/1998 | Sayeed et al. | ................ | 714/774 |
| 5,940,772 A | 8/1999 | Kameda | | |
| 6,128,763 A * | 10/2000 | LoGalbo et al. | ............. | 714/774 |
| 6,301,681 B1 * | 10/2001 | Chen et al. | ..................... | 714/751 |
| 6,314,535 B1 * | 11/2001 | Morris et al. | ................. | 714/708 |
| 6,505,034 B1 * | 1/2003 | Wellig | ............................ | 455/69 |
| 6,643,259 B1 * | 11/2003 | Borella et al. | ................ | 370/231 |
| 6,697,984 B1 * | 2/2004 | Sim et al. | ...................... | 714/751 |
| 6,823,005 B1 * | 11/2004 | Chuang et al. | ................ | 375/227 |
| 6,891,810 B2 * | 5/2005 | Struhsaker et al. | ........... | 370/294 |
| 6,947,381 B2 * | 9/2005 | Wen et al. | ..................... | 370/231 |
| 6,986,158 B1 * | 1/2006 | Terui et al. | .................... | 725/116 |
| 7,221,656 B1 * | 5/2007 | Aweya et al. | ................ | 370/252 |
| 7,278,081 B1 * | 10/2007 | Blair et al. | .................... | 714/752 |
| 7,292,825 B2 * | 11/2007 | Beale et al. | ................ | 455/67.11 |
| 7,320,099 B2 * | 1/2008 | Miura et al. | .................. | 714/748 |

(Continued)

FOREIGN PATENT DOCUMENTS

| | | |
|---|---|---|
| JP | 3-274937 | 12/1991 |
| JP | 7-67175 A | 3/1995 |
| JP | 2001-016584 | 1/2001 |
| JP | 2003-179580 | 6/2003 |

OTHER PUBLICATIONS

Japanese Notice of Rejection dated Oct. 6, 2009 for corresponding Japanese Patent Application No. 2007-510254. A partial English-language translation is provided.

*Primary Examiner* — Gregory Sefcheck
(74) *Attorney, Agent, or Firm* — Fujitsu Patent Center (57) ABSTRACT

An object of the present invention is to enable a real-time distribution even if the band of a network varies. A distributing apparatus receives a packet retransmission request or a packet restoration notification, which is transmitted from a receiving apparatus, with an error information receiving unit. If the number of received retransmission requests or that of restoration notifications becomes equal to or larger than a certain value, a distribution band controlling unit decreases a band used to distribute a packet by a certain band.

9 Claims, 11 Drawing Sheets

U.S. PATENT DOCUMENTS

| | | | |
|---|---|---|---|
| 7,397,759 B2 * | 7/2008 | Tan et al. | 370/216 |
| 7,673,211 B2 * | 3/2010 | Meyer et al. | 714/748 |
| 7,715,469 B2 * | 5/2010 | Chuang et al. | 375/227 |
| 2002/0054578 A1 * | 5/2002 | Zhang et al. | 370/328 |
| 2003/0002501 A1 * | 1/2003 | Reme | 370/389 |
| 2003/0126238 A1 | 7/2003 | Kohno et al. | |
| 2004/0194008 A1 * | 9/2004 | Garudadri et al. | 714/821 |
| 2006/0005101 A1 * | 1/2006 | Li et al. | 714/758 |

* cited by examiner

PACKET DISTRIBUTION BAND CONTROLLING METHOD, DISTRIBUTING APPARATUS, AND VIDEO DISTRIBUTING SYSTEM

CROSS REFERENCE TO RELATED APPLICATION

This application is a continuation application of International PCT Application No. PCT/JP2005/005579 which was filed on Mar. 25, 2005.

BACKGROUND OF THE INVENTION

1. Field of the Invention

The present invention relates to a distribution band controlling method for a packet including video or audio data, a packet distributing apparatus, and a video distributing system.

2. Description of the Related Art

The demand for a data communication such as an Internet communication, etc. of image data, audio data, etc. via various communication means has been increasing. As communication services using the Internet, video-on-demand, the streaming distribution of a live video, a teleconference system, etc. exist.

With the stream distribution, image data must be transmitted in real time, and RTP (Real-time Transport Protocol) is known as an Internet technique suitable for such a real-time communication. With a data communication using RTP, a transmitting side adds a time stamp to a packet as time information, and a receiving side reproduces a received packet in order of time by referencing the time stamp. As a result, synchronous reproduction can be made without being influenced by a delay or a jitter at the time of a packet transfer.

However, since RTP does not guarantee a real-time data communication, a distribution delay or a packet loss can occur on a network for a packet based on RTP similar to packets of other protocols. Therefore, there is a problem that a receiving side cannot make reproduction while maintaining quality even if a data distribution process of the high quality is executed.

To overcome the above described problem in a data transfer using RTP, a packet retransmission request, and the transmission of a retransmission packet are considered to be made by using TCP (Transmission Control Protocol) having high reliability of a data transfer.

However, the throughput and the delay of TCP are respectively low and large although it is good at an error correction. Accordingly, there is a possibility that a packet does not reach in time for reproduction even if it is retransmitted in response to a retransmission request on a decoder side, and TCP has a problem from the viewpoint of the implementation of a real-time communication.

As an error correction method when a packet loss occurs, an FEC (Forward Error Correction) technique is known.

Figure 10:
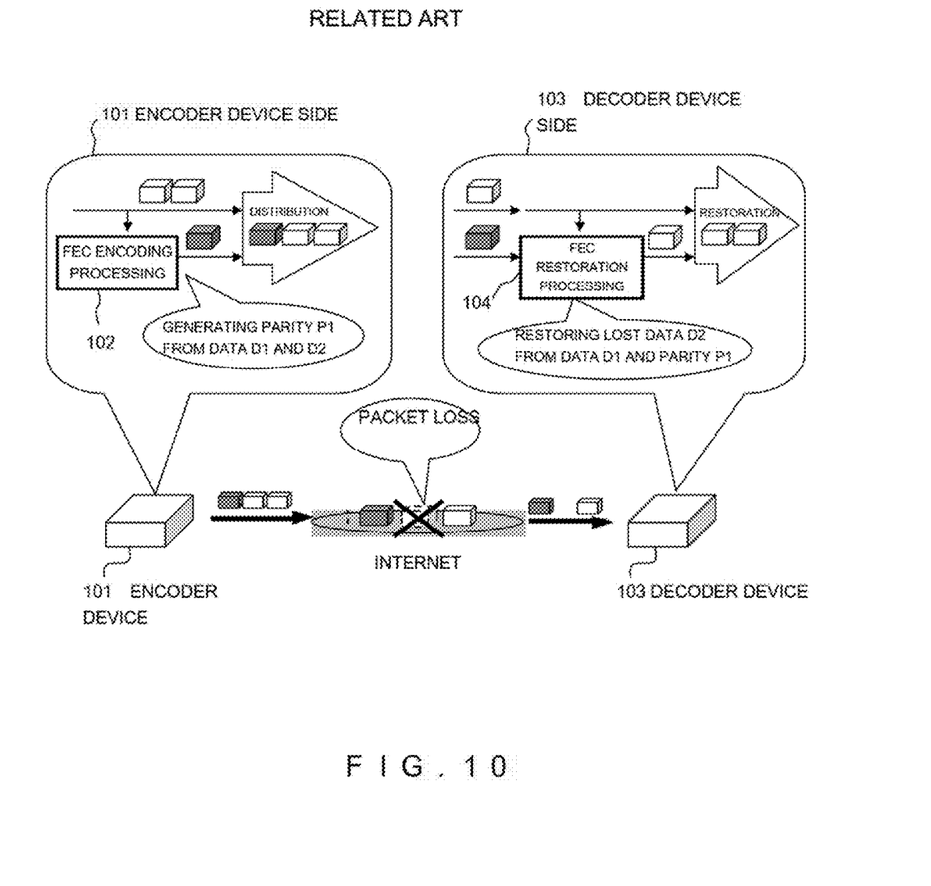
FIG. 10 explains the restoration of a packet by using an FEC packet.

FIG. 10 explains an error correction using FEC in a video distributing system.

In FIG. 10, an encoder device 101 generates a redundant parity P1 from transmission data D1 and D2 in an EFC encoding processing unit 102, and distributes data packets storing the transmission data D1, D2, . . . , and a redundant packet storing the redundant parity to a decoder device 103.

If a packet loss occurs on the side of the decoder device 103, an FEC restoration processing unit 104 restores the lost packet by using the redundant packet. For example, if a packet storing the data D1 is lost, the data D1 is restored from the redundant packet P1 and the data D2.

With the above described error correction using FEC, it becomes difficult to restore a packet if a bursty packet loss occurs.

Figure 11:
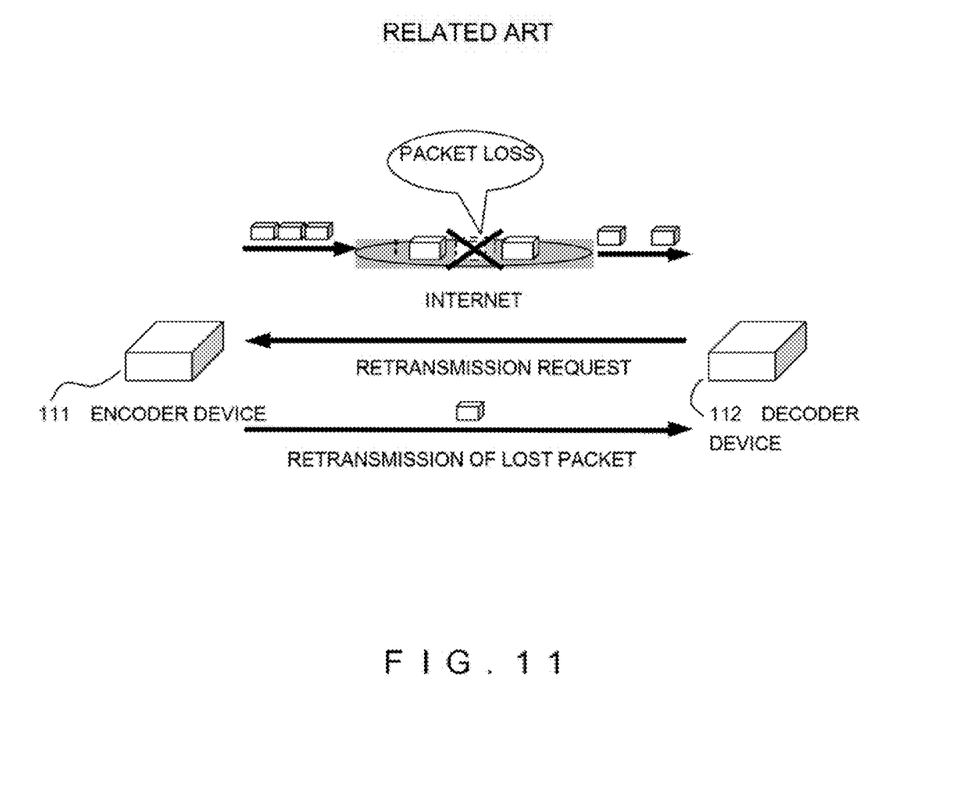
FIG. 11 explains an error correction technique using ARQ.

As an error correction method used when a bursty packet loss occurs, a technique called ARQ (Automatic Repeat Request) is known. FIG. 11 explains this technique.

This error correction method compensates for a packet loss in a way such that a decoder device 112 transmits a request to retransmit a lost packet to an encoder device 111 the moment when the packet loss occurs, and the encoder device 111 distributes the requested packet to the decoder device 112.

Patent Document 1 recites that an error control of FEC or ARQ is dynamically changed based on the state of a network monitored by a network state monitoring unit.

However, the error control based on the state of a network, which is recited by Patent Document 1, only means that an error correction using ARQ is made if a both-way propagation delay (RTT) of the network is shorter as a result of determining whether the both-way propagation delay is either longer or shorter than a predetermined value, and an error correction using FEC is made if the RTT is longer.

Patent Document 1: Japanese Published Unexamined Patent Application No. 2003-179580

SUMMARY OF THE INVENTION

An object of the present invention is to enable a real-time distribution that ensures the quality of video data, etc. when the band of a network varies.

The present invention is a packet distribution band controlling method for use in a distributing apparatus for distributing via a network a packet including video or audio data. This method comprises receiving a packet retransmission request or a packet restoration notification for notifying that the packet is restored, which is transmitted from a receiving apparatus, and variably controlling a band used to distribute the packet based on the number of packet retransmission requests or the number of packet restoration notifications, which are received within a preset time.

According to the present invention, the real-time distribution of video can be maintained while ensuring preset quality by decreasing a band used for a distribution if the band of a network used for the distribution decreases, and the number of errors increases on a receiving side.

In the above described packet distribution band controlling method according to the present invention, the band used to distribute the packet is increased by a band used to transmit a redundant packet for an error correction, if the number of packet retransmission requests or the number of packet restoration notifications, which are received within the preset time, is smaller than a certain value.

With such a configuration, the band of a network can be effectively utilized by increasing the band used to distribute the packet by the band used to transmit the redundant packet, if the number of packet retransmission requests or the number of packet restoration notifications is smaller than a certain value and the band of the network has a margin.

In the above described packet distribution band controlling method according to the present invention, the band used to distribute the packet is decreased by the band used to transmit a redundant packet for an error correction, if the number of packet retransmission requests or the number of packet restoration notifications, which are received within the preset time, is equal to or larger than the certain value.

With such a configuration, a real-time distribution can be maintained while ensuring preset quality by decreasing the band used to distribute a packet by the band used for the redundant packet to reduce packet losses if the band of a network decreases.

In the above described packet distribution band controlling method according to the present invention, the packet is an MPEG stream for storing data encoded with MPEG, and a distribution band of the MPEG stream is variably controlled based on the number of retransmission requests, and the number of Forward Error Correction packet restoration notifications, which are received within the preset time.

With such a configuration, a real-time distribution can be maintained while ensuring preset quality even if the band of a network varies when an MPEG stream is distributed.

DESCRIPTION OF THE PREFERRED EMBODIMENTS

Figure 1:
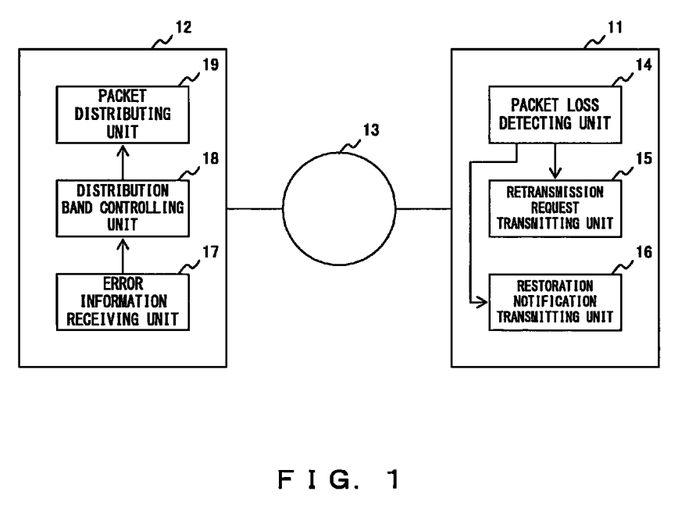
FIG. 1 shows the fundamental configuration of a video distributing system according to the present invention.

A preferred embodiment according to the present invention is described below with reference to the drawings. FIG. 1 shows the fundamental configurations of a distributing apparatus 12 and a receiving apparatus 11 of a video distributing system according to the present invention.

In FIG. 1, the receiving apparatus 11 receives a packet including video data or audio data, which is encoded and transmitted from the distributing apparatus 12 via a network 13, and reproduces the received packet in accordance with time information.

The receiving apparatus 11 comprises a packet loss detecting unit 14 for detecting the loss of a received packet, a retransmission request transmitting unit 15 for transmitting a request to retransmit a lost packet if the loss of the packet is detected, and a restoration notification transmitting unit 16 for transmitting a packet restoration notification when the packet is restored by using a redundant packet.

The distributing apparatus 12 comprises an error information receiving unit 17 for receiving error information such as the retransmission request, the restoration notification, or the like, which are transmitted from the receiving apparatus 11, a distribution band controlling unit 18 for controlling the distribution band of a packet based on the error information received by the error information receiving unit 17, and a packet distributing unit 19 for distributing a packet by using a band (transmission rate) specified by the distribution band control 18.

With a decrease in the band of the network 13 used to distribute a packet, the number of losses of packets increases on the side of the receiving apparatus 11, and the distribution band controlling unit 18 decreases occurrences of errors such as a packet loss, etc. on the receiving side by decreasing the band used to distribute a packet if the number of packet retransmission requests received by the distributing apparatus 12 or the number of restoration notifications, which are received by the distributing apparatus 12, for notifying that a lost packet is restored by using redundant data becomes equal to or larger than a predetermined value. As a result, the real-time distribution of video can be maintained while ensuring desired quality.

Figure 2:
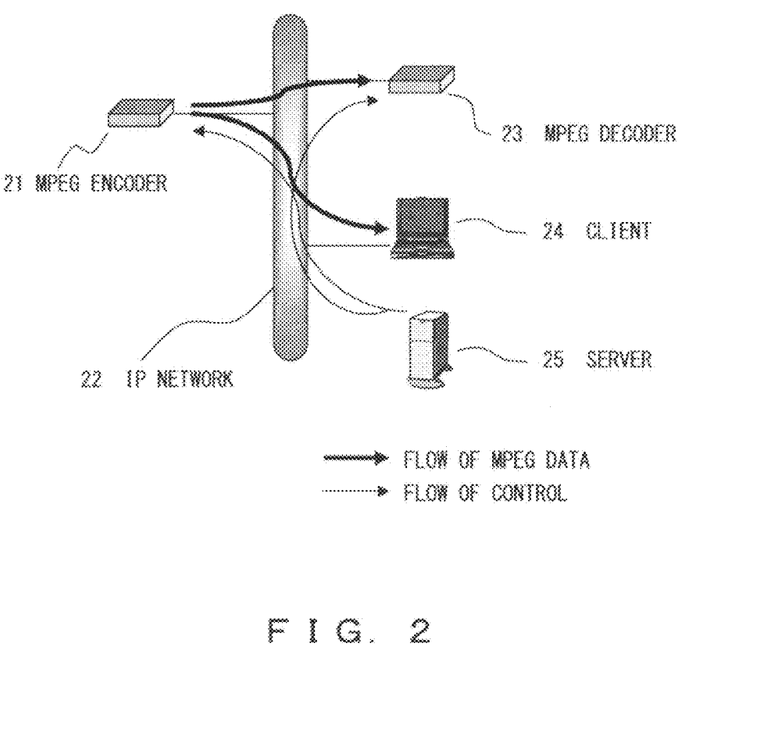
FIG. 2 shows the system configuration of a video distributing system according to a preferred embodiment.

Next, FIG. 2 shows the system configuration of a video distributing system according to a preferred embodiment. This video distributing system is composed of an MPEG encoder 21 for live-distributing video data with an MPEG stream, and an MPEG decoder 23 for receiving and reproducing the MPEG stream distributed from the MPEG encoder 21.

In FIG. 2, the MPEG encoder (distributing apparatus) 21 encodes image data with an MPEG method, converts the encoded MPEG data into an MPEG stream (packets) based on the Internet Protocol (IP), and transmits the stream to an Internet Protocol network (hereinafter referred to as an IP network) 22.

To the IP network 22, a plurality of MPEG decoders (receiving apparatuses) 23, and a plurality of clients (receiving apparatuses) implemented by personal computers, and one or a plurality of servers 25 are connected. The servers 25 transmit setting data such as the operation conditions, etc. of the MPEG encoder 21 and the MPEG decoder 23.

The MPEG decoders 23 receive a packet distributed from the MPEG encoder 21, decode MPEG data stored in the packet, and reproduce an image and audio. The clients 24 have an MPEG decoding function, and reproduce an image and audio by decoding the data of a packet.

Figure 3:
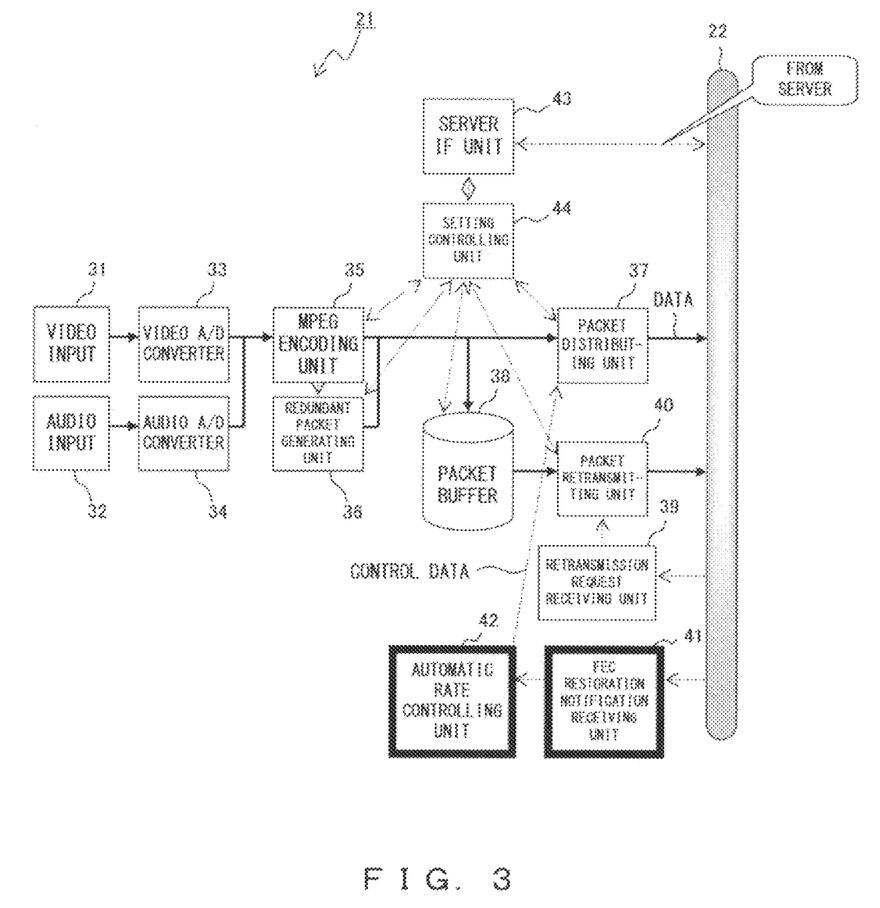
FIG. 3 shows the configuration of an MPEG encoder.

FIG. 3 is a block diagram showing the configuration of the MPEG encoder 21. In FIG. 3, thick-line arrows indicate the flow of data, whereas thin-line arrows indicate the flow of control data.

Analog video signal and audio signal input from a video inputting unit 31 and a audio inputting unit 32 of FIG. 3 are converted into-digital data by a video A/D converter 33 and a audio A/D converter 34, the video and the audio data are encoded with an MPEG method by an MPEG encoding unit 35, and further converted into IP packets in accordance with the IP protocol. A redundant packet generating unit 36 performs an exclusive-OR operation for a plurality of packets, and generates a redundant packet for an error correction based on the result of the operation.

Packets generated by the MPEG encoding unit 35 and the redundant packet generating unit 36 are output to a packet distributing unit 37, and stored in a packet buffer 38. The packet distributing unit 37 transmits the packets to the IP network 22 at a predetermined transmission rate.

A retransmission request receiving unit 39 receives a packet retransmission request from the receiving apparatuses 24 such as the MPEG decoders 23, the clients 24, etc. at distribution destinations. If the retransmission request is received, the retransmission request receiving unit 39 instructs a packet retransmitting unit 50 to retransmit the corresponding packet. The packet retransmitting unit 40 reads the transmitted packet from the packet buffer 38, and transmits the read packet to the IP network 22.

An FFC restoration notification receiving unit 41 receives a packet restoration notification, which is transmitted from the MPEG decoders 23, the clients 24, etc., for notifying that a packet is restored with FEC (Forward Error Correction), and outputs the result of the reception to an automatic rate controlling unit 42.

The automatic rate controlling unit 42 estimates that the band of the IP network varies according to the result of the reception of the FEC restoration notification receiving unit 41 or the retransmission request receiving unit 39, and instructs the packet distributing unit 37 to increase/decrease the band used to distribute a packet.

A server interface (IF) unit 43 is an interface unit for receiving setting data from the server 25, and outputs various types of setting data received from the server 25 to a setting controlling unit 44. The setting controlling unit 44 sets, for example, encoding mode in the MPEG encoding unit 35, sets a live distribution address in the packet distributing unit 37, sets the generation ratio of a redundant packet in the redundant packet generating unit 36, and sets the storage time of a retransmission packet in the packet buffer 38, in accordance with the setting data from the server 25.

Figure 4:
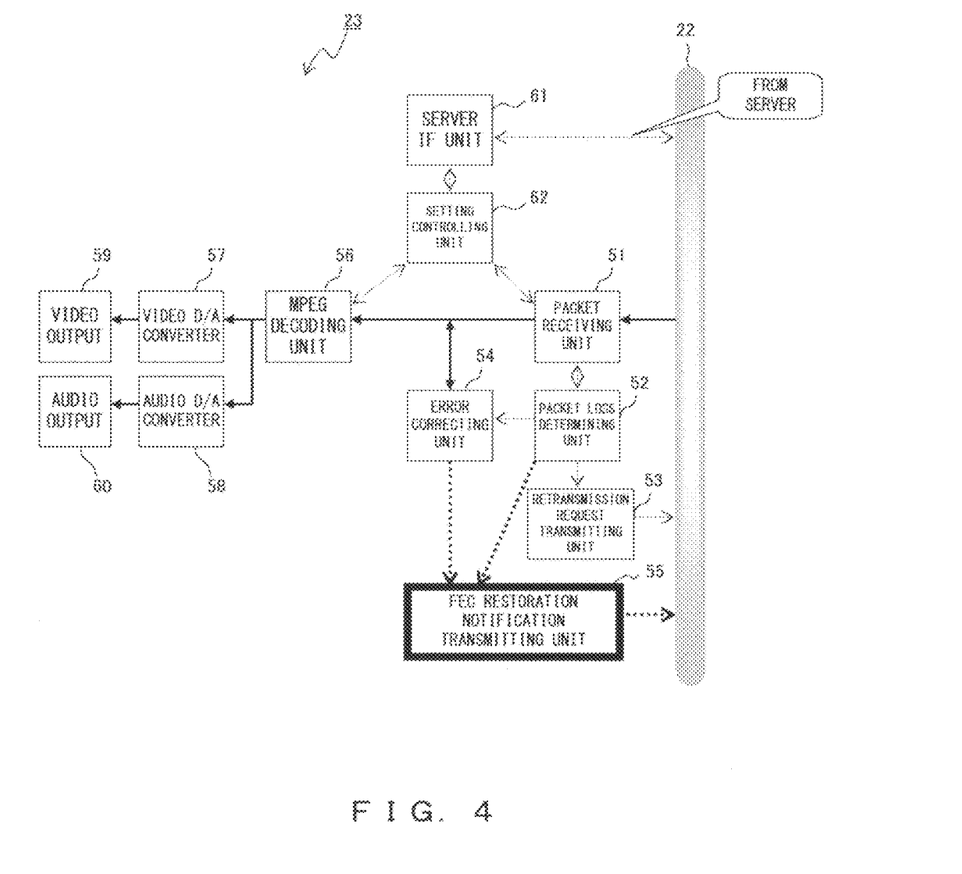
FIG. 4 shows the configuration of an MPEG decoder.

Next, FIG. 4 is a block diagram showing the configuration of the MPEG decoder 23. In FIG. 4, thick-line arrows indicate the flow of data, whereas thin-line arrows indicate the flow of control data.

A packet receiving unit 51 of FIG. 4 receives a packet distributed from the MPEG encoder 21. A packet loss determining unit 52 determines the loss of a packet.

An error correcting unit 54 makes an error correction by restoring a lost packet from a video or audio data packet and a redundant packet if the loss of the packet is detected, and notifies an FEC restoration notification transmitting unit 55 that the packet is restored.

The above described packet loss determining unit 52 instructs a retransmission request transmitting unit 53 to transmit a packet retransmission request if the packet cannot be restored by the error correcting unit 54. The retransmission request transmitting unit 53 issues the packet retransmission request in accordance with the instruction of the packet loss determining unit 52.

An FEC restoration notification transmitting unit 55 transmits an FEC restoration notification to the MPEG encoder 21 when being notified that the packet is restored from the error correcting unit 54.

When the packet is properly received, an MPEG decoding unit 56 makes MPEG decoding, outputs the decoded video data to a video D/A converter 57, and also outputs the audio data to a audio D/A converter 58. Additionally, if the packet loss determining unit 52 detects the loss of a packet, the MPEG decoding unit 56 makes MPEG decoding after the packet is restored with FEC, or the lost packet is retransmitted in response to a retransmission request.

The video D/A converter 57 converts the video data into an analog video signal and outputs the signal to a video outputting unit 59, whereas the audio D/A converter 58 converts the audio data into an analog audio signal and outputs the signal to a audio outputting unit 60.

A server interface (IF) unit 61 accepts setting data from the server 25, and outputs the setting data to a setting controlling unit 62. The setting controlling unit 62 enables the reception and the decoding of distributed live data by setting the setting data received from the server 25 in the packet receiving unit 51 and the MPEG decoding unit 56.

The processing operations of the MPEG encoder 21 and the MPEG decoder 23, which have the above described configurations, are described next with reference to the flowcharts of FIGS. 5 to 7.

Figure 5:
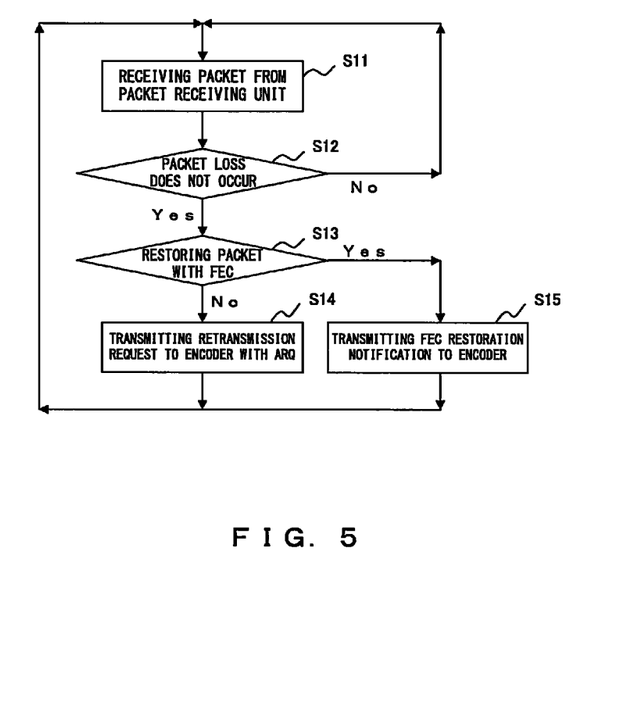
FIG. 5 is a flowchart showing an FEC restoration notification transmission process.

FIG. 5 is a flowchart showing an FEC restoration notification transmission process of the MPEG decoder 23.

A packet distributed from the MPEG encoder 21 is received by the packet receiving unit 51 of the MPEG decoder 23 (S11 of FIG. 5).

Next, it is determined whether or not the packet received by the packet receiving unit 51 is lost (S12). If the packet is not lost ("NO" in S12), the flow returns to step S11, in which the next packet is determined.

Or, if the packet is lost ("YES" in S12), the flow proceeds to step S13, in which the lost packet is restored with FEC (Forward Error Correction) by using a redundant packet, and a data packet that can be received (S13).

If the packet cannot be restored with FEC ("NO" in S13), the flow proceeds to step S14, in which a request to retransmit the lost packet is transmitted from the retransmission request transmitting unit 53 to the MPEG encoder 21 by using an ARQ (Automatic Repeat Request) error correction technique.

Or, if the lost packet can be restored with FEC ("YES" in S13), the flow proceeds to step S15, in which an FEC restoration notification for notifying that the packet is restored is transmitted from the FEC restoration notification transmitting unit 55 to the MPEG encoder 21.

Figure 6:
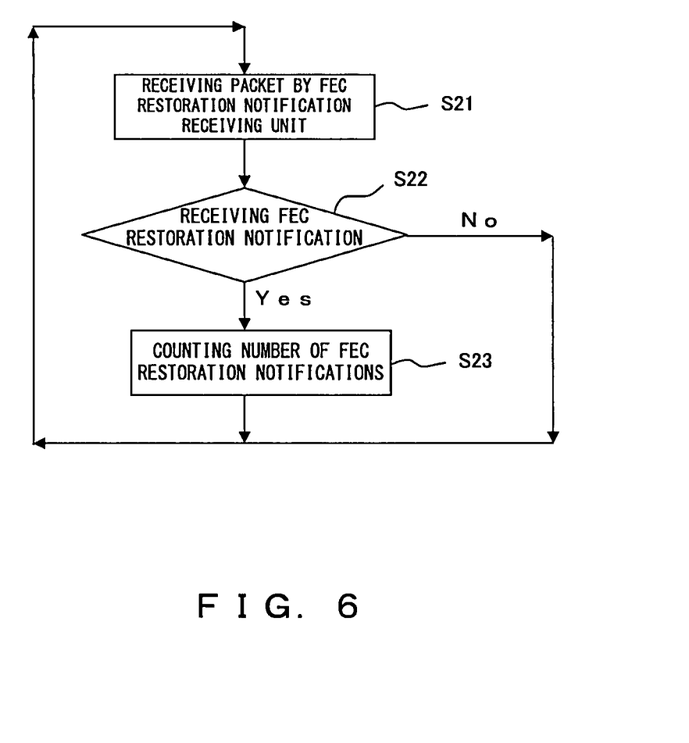
FIG. 6 is a flowchart showing an FEC restoration notification reception process.

FIG. 6 is a flowchart showing an FEC restoration notification reception process on the side of the MPEG encoder 21.

Upon receipt of a packet by the FEC restoration notification receiving unit 41 of the MPEG encoder 21 (S21 of FIG. 6), it is determined whether or not the received packet is an FEC restoration notification (S22).

If the received packet is the FEC restoration notification ("YES" in S22), the flow proceeds to step S23, in which the number of FEC restoration notifications is counted. Or, if the received packet is not the FEC restoration notification ("NO" in S22), the process is terminated.

A control process for a band used to distribute a packet in the MPEG encoder 21 is described next with reference to the flowchart of FIG. 7.

Figure 7:
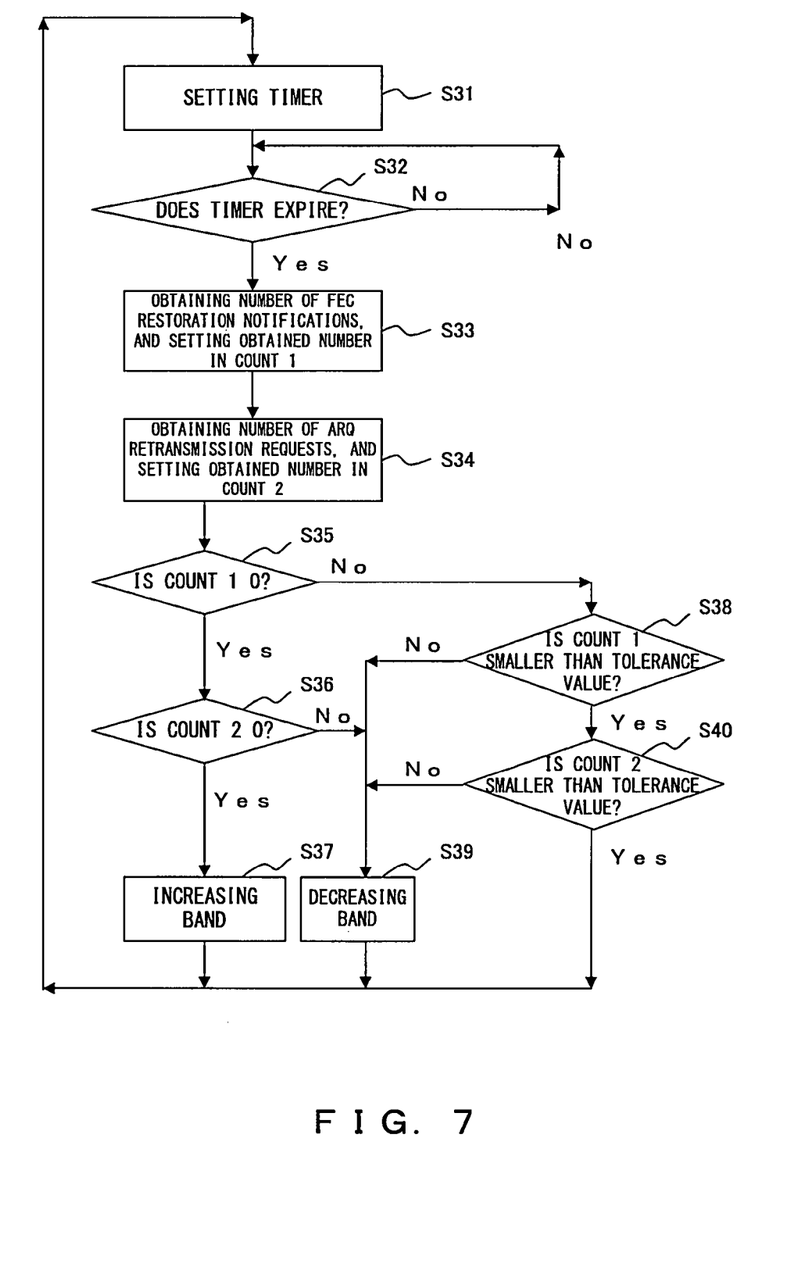
FIG. 7 is a flowchart showing a packet distribution band control process.

Initially, a preset time for counting the number of FEC restoration notifications, and the number of ARQ retransmission requests is set in a timer (S31 of FIG. 7).

Next, it is determined whether or not a time measured by the timer reaches the preset time (S32). If the time measured by the timer does not reach the preset time ("NO" in S32), the measurement of the timer is continued, and the above described FEC restoration notification reception process is executed during that time.

If the value of the timer reaches the preset value ("YES" in S32), the flow proceeds to step S33, in which the number of FEC restoration notifications, which is counted during the time set in the timer, is set in a counter COUNT 1.

Next, the number of ARQ retransmission requests is set in a counter COUNT 2 (S34). Here, the number of ARQ retransmission requests is the cumulative value of packet retransmission requests received by the retransmission request receiving unit 39 of FIG. 3 within the above described preset time, and indicates an occurrence frequency of the loss of a packet on the side of the MPEG decoder 23.

Next, it is determined whether or not the value of the counter COUNT 1 is 0 (S35). If the value of the COUNT 1 is 0 ("YES" in S35), the flow proceeds to step S36, in which it is determined whether or not the value of the counter COUNT 2 is 0. If the value of the COUNT 2 is 0, the flow proceeds to step S37, in which a band used to distribute a medium (a packet of video, audio, etc.) is increased by a predetermined band, for example, by a band used to transmit an FEC packet (redundant packet).

Namely, if neither a packet restoration notification using FEC nor a packet retransmission request is transmitted from the MPEG decoder 23, a network band used for a distribution is estimated to have a margin, and the band used to distribute the medium is increased. As a result, the band of the network can be effectively utilized to make a distribution.

Or, if the value of the COUNT 1 is determined not to be 0 in step S35 ("NO" in S35), the flow proceeds to step S38, in which it is determined whether or not the value of the COUNT 1 is smaller than a first tolerance value.

If the value of the COUNT 1 is smaller than the tolerance value ("YES" in S35), the flow proceeds to step S40, in which it is determined whether or not the value of the COUNT 2 is smaller than a second tolerance value.

If both of the values of the COUNTs 1 and 2 are smaller than the first and the second tolerance values ("YES" in S38 and S40), this is a case where the number of error corrections using an EFC packet is small, and the number of packet retransmission requests is small. Therefore, the band used to distribute the medium is not changed.

If the value of the COUNT 1 is equal to or larger than the first tolerance value in step S38 ("NO" in S38), the flow proceeds to step S39, in which the band used to distribute a medium packet is decreased by a predetermined band, for example, by a band used to transmit an FEC packet.

Also if the value of the COUNT 2 is equal to or larger than the second tolerance value in step S40 ("NO" in S40), the flow proceeds to step S39, in which the band used to distribute the medium is decreased by the band used to distribute an FEC packet.

Namely, if the number of packet restoration notifications using an FEC packet is equal to or larger than the first tolerance value, or if the number of packet retransmission requests is equal to or larger than the second tolerance value, the band of the network is determined to decrease, and the band used to distribute the medium is decreased by the band used for an FEC packet on the distributing side. Then, the medium is distributed with the decreased band, and it is again determined whether or not the number of packet restoration notifications and the number of packet retransmission requests, which are transmitted from the receiving side, are smaller than the above described tolerance values. If the numbers are equal to or larger than the tolerance values, the band used to distribute the medium is again decreased by the band used for an FEC packet. With such a band control, the real-time distribution of video can be implemented while ensuring predetermined quality by variably controlling a distribution band even if the band of the network used to distribute a packet varies and the number of packet losses increases. Additionally, if the number of packet restoration notifications and that of packet retransmission requests are 0, the band used to distribute a packet is increased by the band used for an FEC packet. As a result, the band of the network can be effectively utilized.

Figure 8:
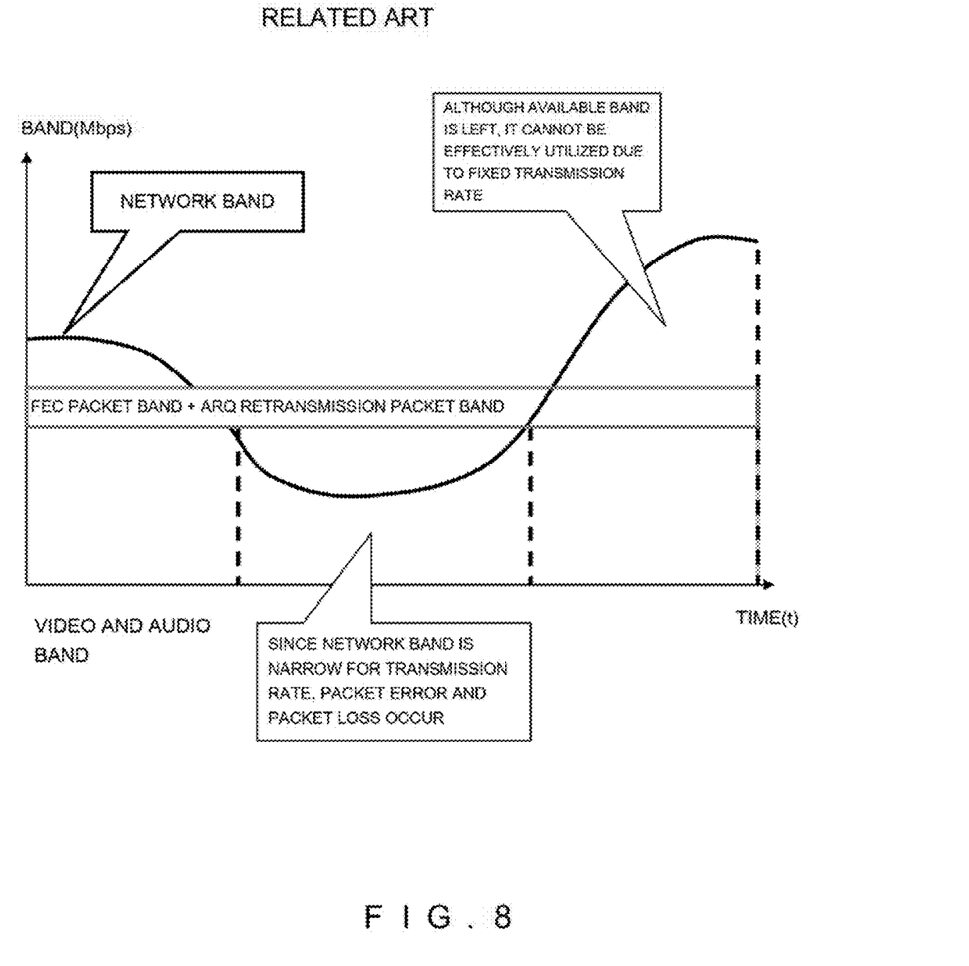
FIG. 8 explains a conventional distribution band.
Figure 9:
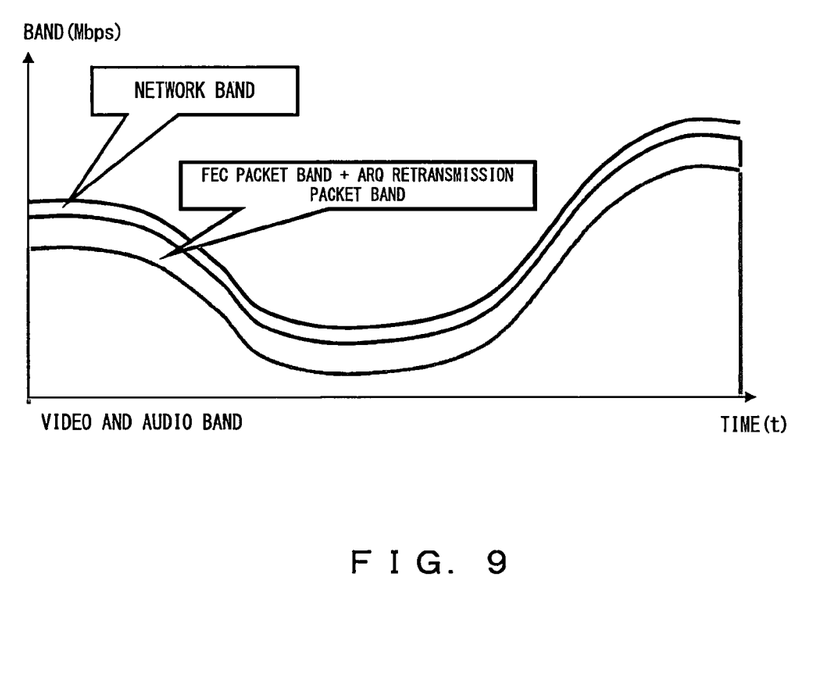
FIG. 9 explains a distribution band according to the preferred embodiment.

Here, a comparison between a conventional method fixing the distribution band of a medium, and a method according to the preferred embodiment for variably controlling the distribution band of a medium is made with reference to FIGS. 8 and 9.

For a case where the distribution band of a medium is fixed as shown in FIG. 8, if the band of a network used for a distribution decreases and becomes smaller than the total of a band used to distribute a medium, a band used to transmit an FEC packet, and a band used to transmit an ARQ packet, the occurrence frequency of a packet loss rises and a real-time distribution of preset quality cannot be made. Additionally, a distribution band is not conventionally increased even when the band of a network has a sufficient margin for the distribution band for a medium.

In the meantime, the packet distribution band controlling method according to the preferred embodiment shown in FIG. 9, a band used to distribute a medium is decreased by a band used for an FEC packet on a distributing side if the band of a network becomes smaller than the total of a band used to distribute a medium, a band used to transmit an FEC packet, and a band used to transmit a retransmission packet using ARQ. Then, the medium is distributed with the newly set band, and it is determined whether or not the number of packet restoration notifications using FEC, and the number of retransmission requests using ARQ become smaller than predetermined values. If the numbers are equal to or larger than the predetermined values, the band used to distribute the medium is again decreased by the band used for an FEC packet. Hereafter, this band control is repeated, and the distribution band is made to maintain its state if the number of packet restoration notifications and the number of retransmission requests using ARQ become smaller than the predetermined values.

As a result, even if the band of the network used for a distribution varies as shown in FIG. 9, a distribution band suitable for an actual communication band comprised by the network at that time can be set as the distribution band of a medium. In consequence, a real-time distribution ensuring predetermined video quality can be implemented.

The present invention is not limited to the above described preferred embodiment, and may be configured, for example, as follows.

(1) In the preferred embodiment, the band used for a medium is decreased by the band used for an FEC packet if the number of packet restoration notifications using FEC or the number of retransmission requests using ARQ becomes equal to or larger than a predetermined value. However, the band decrease is not limited to this implementation. The band may be decreased by a predetermined band.

(2) In the preferred embodiment, a distribution band is controlled based on both of the number of packet restoration notifications using FEC and that of retransmission requests using ARQ. However, the distribution band may be controlled based on either of the numbers.

(3) The present invention is not limited to a data packet encoded with an MPEG method, and also applicable to data encoded with another encoding method, or data not encoded.

What is claimed is:

1. A packet distribution band controlling method for use in a distributing apparatus for distributing via a network a packet including video or audio data, comprising:
   receiving a packet retransmission request or a packet restoration notification for notifying that the packet is restored, which is transmitted from a receiving apparatus by the distributing apparatus; and
   counting respectively the packet restoration notification and the packet retransmission request to produce count values, when the count value of the packet restoration notification is larger than zero and either of the count values or a total of said count values equals or is larger than a certain value required so as to ensure a predetermined quality of the video or audio data and distribute the video or audio data in real time, decreasing a band used to transmit the packet of video or audio data by a band used to transmit a packet corresponding to the count value equal to or larger than the certain value, when the count value of the packet restoration notification is zero and the count value of the packet retransmission request is larger than zero, decreasing a band used to transmit the packet of video or audio data by a band used to transmit a packet corresponding to notifications the count value of the packet retransmission request, and when both of the count values are zero, increasing said band, and repeating said decreasing and said increasing.

2. The packet distribution band controlling method according to claim 1, wherein
the band used to transmit the packet of video or audio data is increased by a band used to transmit a redundant packet for an error correction, if the number of packet retransmission requests and the number of packet restoration notifications, which are received within a preset time, are smaller than the certain value.

3. The packet distribution band controlling method according to claim 1, wherein
the packet of video or audio data is an MPEG stream for storing data encoded with MPEG, and a distribution band of the MPEG stream is variably controlled based on the number of retransmission requests using Automatic Repeat Request, and the number of restoration notifications using a Forward Error Correction packet which are received within a preset time.

4. A distributing apparatus for distributing via a network a packet including video or audio data, comprising:
error information receiving unit receiving a packet retransmission request or a packet restoration notification for notifying that the packet is restored, which is transmitted from a receiving apparatus; and
distribution band controlling unit counting respectively the packet restoration notification and the packet retransmission request to produce count values, when the count value of the packet restoration notification is larger than zero and either of the count values or a total of said count values equals or is larger than a certain value required so as to ensure a predetermined quality of the video or audio data and distribute the video or audio data in real time, decreasing a band used to transmit the packet of video or audio data by a band used to transmit a packet corresponding to the count value equal to or larger than the certain value, when the count value of the packet restoration notification is zero and the count value of the packet retransmission request is larger than zero, decreasing a band used to transmit the packet of video or audio data by a band used to transmit a packet corresponding to the count value of the packet retransmission request, which is received by said error information receiving unit within a preset time, and when both of the count values are zero, increasing said band, and repeating said decreasing and said increasing.

5. The distributing apparatus according to claim 4, wherein
said distribution band controlling unit increases the band used to transmit the packet of video or audio data by a band used to transmit a redundant packet for an error correction, if the number of packet retransmission requests and the number of packet restoration notifications, which are received by said error information receiving unit within the preset time, are smaller than the certain value.

6. The distributing apparatus according to claim 4, wherein
the packet of video or audio data is an MPEG stream for storing data encoded with an MPEG method; and said distribution band controlling unit variably controls a band used to distribute the MPEG stream based on the number of retransmission requests using Automatic Repeat Request, and the number of restoration notifications using a Forward Error Correction packet, which are received by said error information receiving unit within the preset time.

7. A video distributing system for distributing via a network a packet including video or audio data, comprising:
a receiving apparatus; and
a distributing apparatus, wherein
said receiving apparatus having
detecting unit detecting a loss of a packet distributed via the network,
retransmission request transmitting unit transmitting a packet retransmission request when said detecting unit detects the loss of the packet, and
restoration notification transmitting unit transmitting a packet restoration notification when said detecting unit detects the loss of the packet, and the lost packet is restored, and
said distributing apparatus having
distributing unit distributing the packet including video or audio data to said receiving apparatus via the network,
error information receiving unit receiving the packet restoration notification and the packet retransmission request transmitted from said receiving apparatus, and
distribution band controlling unit counting respectively the packet restoration notification and the packet retransmission request to produce count values, when the count value of the packet restoration notification is larger than zero and either of the count values or a total of said count values equals or is larger than a certain value required so as to ensure a predetermined quality of the video or audio data and distribute the video or audio data in real time, decreasing a band used to transmit the packet of video or audio data by a band used to transmit a packet corresponding to the count value equal to or larger than the certain value, when the count value of the packet restoration notification is zero and the count value of the packet retransmission request is larger than zero, decreasing a band used to transmit the packet of video or audio data by a band used to transmit a packet corresponding to the count value of the packet retransmission request, which is received by said error information receiving unit within a preset time, and when both of the count values are zero, increasing said band, and repeating said decreasing and said increasing.

8. The video distributing system according to claim 7, wherein
said distribution band controlling unit increases the band used to transmit the packet of video or audio data by a band used to transmit a redundant packet for an error correction, if the number of packet retransmission requests and the number of packet restoration notifications, which are received by said error information receiving unit within the preset time, are smaller than the certain value.

9. The video distributing system according to claim 7, wherein
the packet of video or audio data is an MPEG stream for storing data encoded with an MPEG method; and said distribution band controlling unit variably controls a band used to distribute the MPEG stream based on the number of retransmission requests using Automatic Repeat Request, and the number of restoration notifications using a Forward Error Correction packet, which are received by said error information receiving unit within the preset time.

* * * * *